United States Patent [19]
Ouellette

[11] Patent Number: 5,437,521
[45] Date of Patent: Aug. 1, 1995

[54] AIR CONVEYOR FOR BOTTLES

[75] Inventor: Joseph F. Ouellette, Glendale, Mo.

[73] Assignee: Ouellette Machinery Systems, Inc., Fenton, Mo.

[21] Appl. No.: 62,939

[22] Filed: May 13, 1993

[51] Int. Cl.$^6$ ............................................. B65G 51/02
[52] U.S. Cl. ..................................... 406/88; 406/194
[58] Field of Search ................ 406/86, 88, 191, 192, 406/194; 239/598, 599, 600

[56] References Cited

U.S. PATENT DOCUMENTS

| | | | |
|---|---|---|---|
| 3,081,877 | 3/1963 | Jakobs et al. | 239/600 X |
| 3,477,764 | 11/1969 | Smith | 406/88 |
| 4,218,001 | 8/1980 | Vits | 226/97 |
| 4,284,370 | 8/1981 | Danler et al. | 406/86 |
| 4,437,612 | 3/1984 | Russ et al. | 239/556 |
| 4,500,229 | 2/1985 | Cole et al. | 406/88 |
| 4,822,214 | 4/1989 | Aidlin et al. | 406/86 |
| 4,938,636 | 7/1990 | Aidlin et al. | 406/31 |
| 5,028,174 | 7/1991 | Karass | 406/88 |
| 5,100,265 | 3/1992 | Mirkin | 406/86 |
| 5,102,118 | 4/1992 | Vits | 271/195 |
| 5,147,153 | 9/1992 | Aidlin et al. | 406/86 |
| 5,161,919 | 11/1992 | Smith et al. | 406/86 |

FOREIGN PATENT DOCUMENTS

| | | |
|---|---|---|
| 0249414 | 12/1987 | European Pat. Off. . |
| 2294965 | 7/1976 | France . |
| 2580609 | 10/1986 | France . |
| 1449656 | 11/1968 | Germany . |
| 1907083 | 9/1970 | Germany . |
| 10587 | 9/1990 | WIPO ................................ 406/88 |
| WO90/10587 | 9/1990 | WIPO . |

Primary Examiner—Andrew C. Pike
Attorney, Agent, or Firm—Rogers, Howell & Haferkamp

[57] ABSTRACT

An air conveyor for plastic bottles conveys the bottles at generally constant speed. The bottles are of the type having annular rims around their necks and shoulders below the rims. The air conveyor includes a pair of spaced flanges and a plurality of nozzles for each flange. The flanges provide opposed inner edges which define a central slot extending elongately in the forward to rearward direction. Each flange supports a plurality of nozzles at spaced intervals in the forward to rearward direction for substantially the length of the slot. An air blower supplies pressurized air to the nozzles. Each nozzle discharges air in a stream along a diagonal direction that generally slopes downwardly, inwardly, and forwardly. In use, the flanges provide the neck rims with slidable support as the bottles are blown forwardly through the slot by the force of the air streams against the shoulders. Constant speed is gained through the direction of the air streams against bottle shoulders.

32 Claims, 2 Drawing Sheets

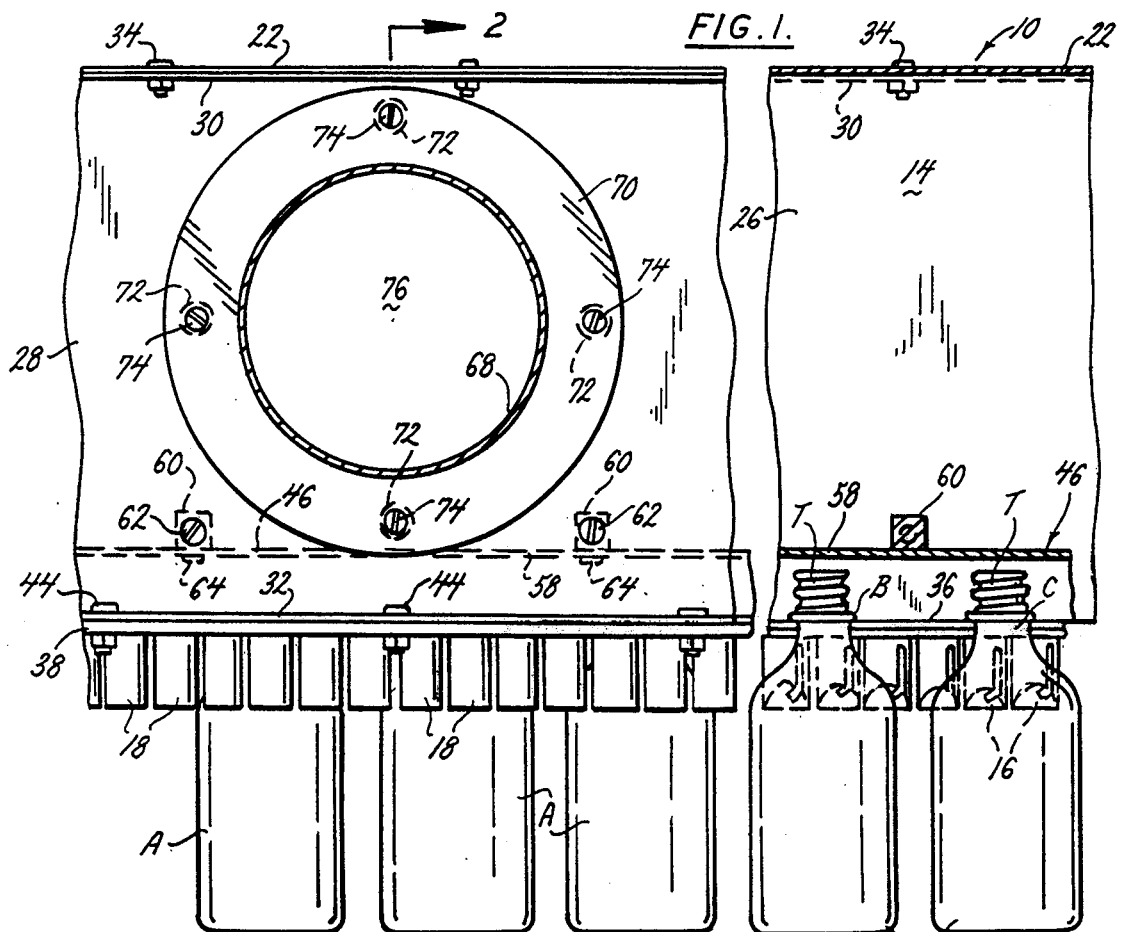
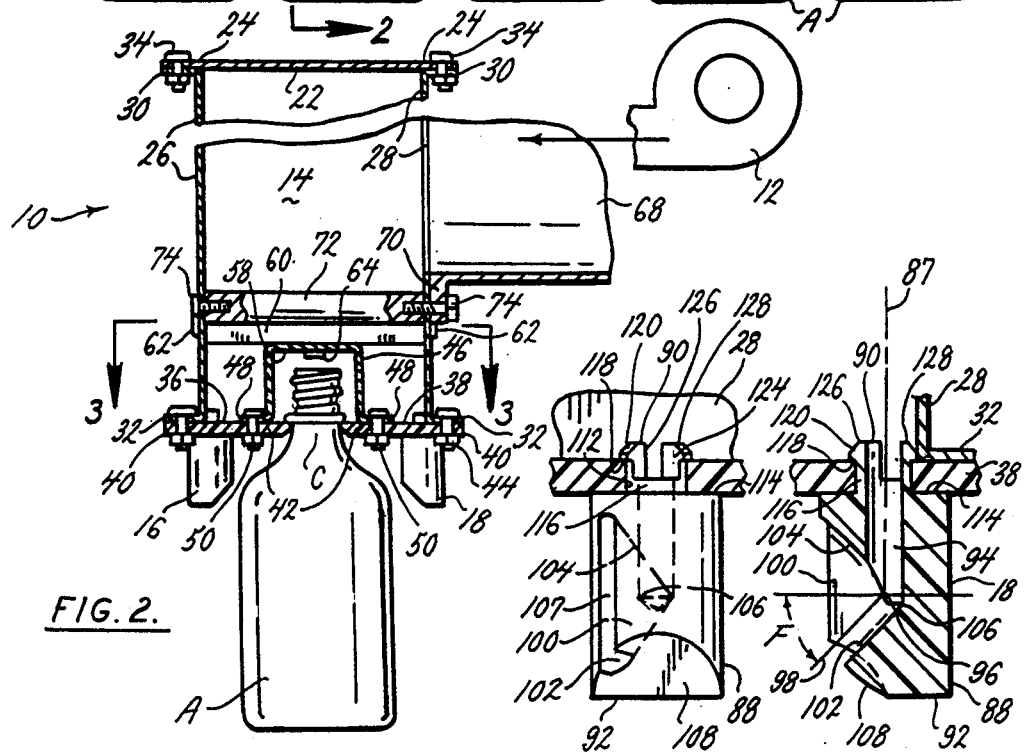
FIG. 1.
FIG. 2.
FIG. 6.    FIG. 5.

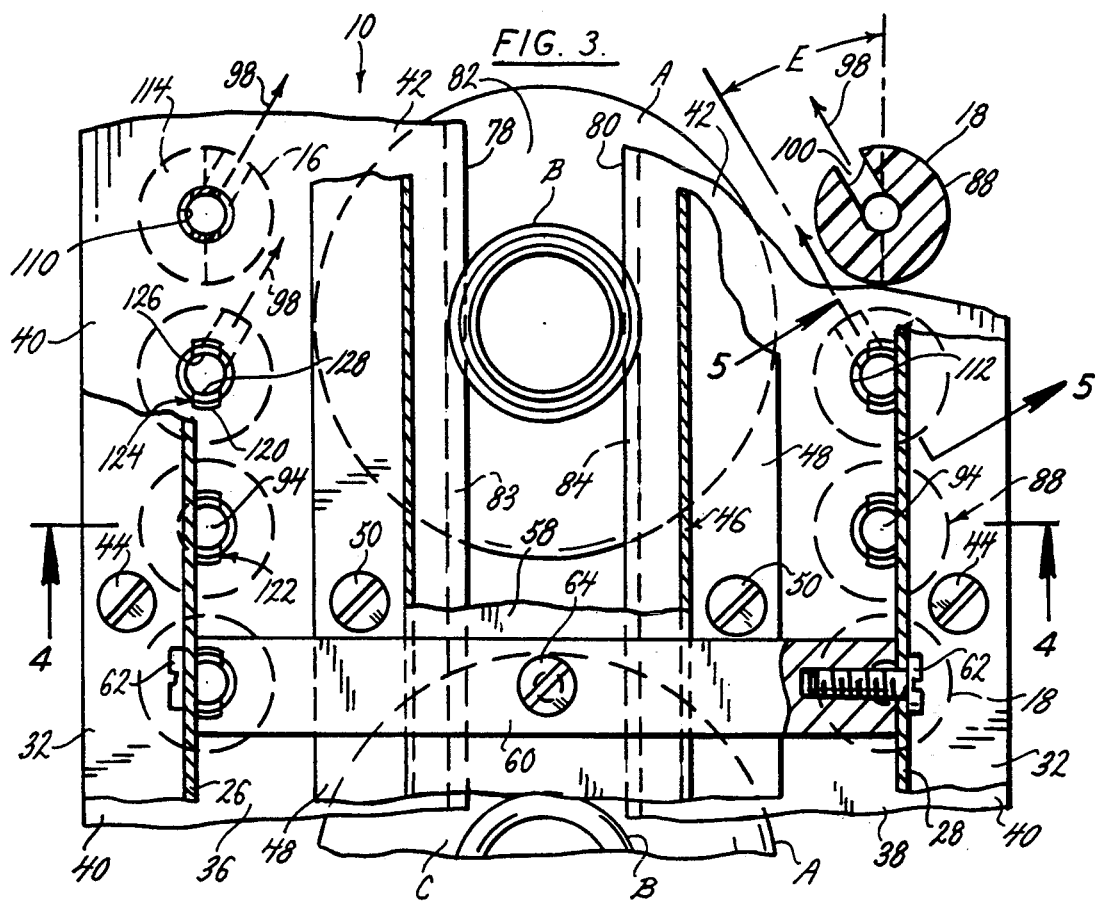
FIG. 3.
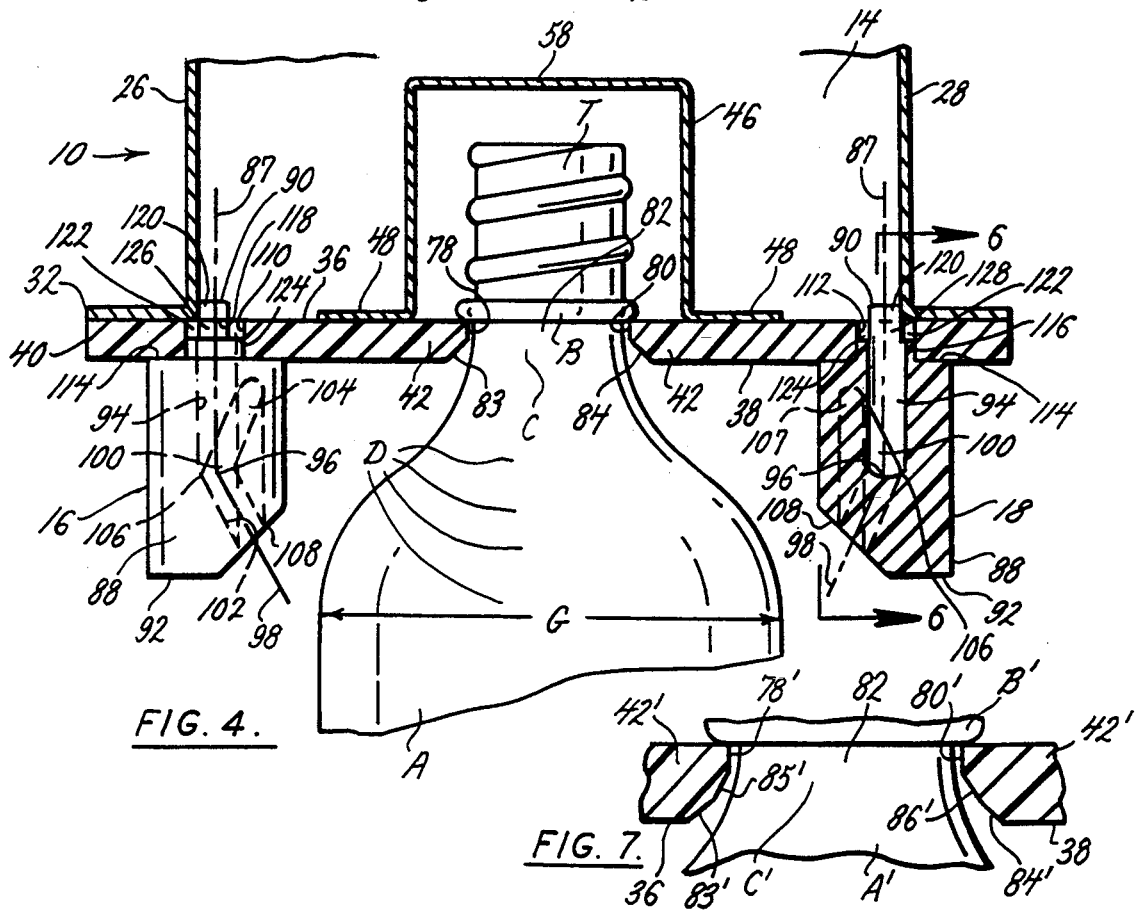
FIG. 4.
FIG. 7.

AIR CONVEYOR FOR BOTTLES

BACKGROUND OF THE INVENTION

The present invention relates to a conveyor that blows plastic bottles along a flow path, and more particularly to an air conveyor that conveys the bottles at substantially constant speed and substantially maintains small spacing between successive plastic bottles along the conveyor path.

An air conveyor is useful for the rapid transport of plastic bottles between work stations as, for example, between a storage station and a bottle-filling station. Typically, the known air conveyor includes a pair of flanges spaced to define an elongated slot between them, and a series of air ducts on opposite sides of the slot. Plastic bottles are formed with annular rims adjacent the tops of their necks. With the bottle necks extending through the slot and the rims overlying the spaced flanges, the bottles are suspended from the flanges and hang below the slot. Pressurized air from the ducts is directed in streams toward the bottles. The bottles move through the slot because of the force of the air streams against the bottles. Preferably, the bottles are conveyed in closely spaced succession.

In at least some of the conventional air conveyors, the air is directed through a plenum within a channel and against the tops of the bottles above the annular rims. This results in turbulence of air emerging through the elongated slot causing fluttering of the bottles and left to right wobbling as they are blown. Frequently, this wobbling will cause the bottles to wedge against one another. Often, side rails must be employed alongside the bodies of the bottles to restrict wobbling.

The known air conveyors for plastic bottles are also deficient because once the bottles accumulate, the force of air required to move the slug (accumulated bottles) as a group must be high to overcome the drag. Consequently, as single or spaced bottles are conveyed by this air, the bottles accelerate to high velocity. This high acceleration is detrimental because the bottles collide with other bottles being conveyed or accumulated downstream. More significantly, such accelerated bottles impact with downstream bottles waiting at a work station, such as ahead of a labeler that is generally set to operate at a constant moderate speed. Conversely, if the force of air is reduced to prevent high acceleration of single or random bottles and therefore to prevent high impact, the reduced air flow will be inadequate to move the slug (accumulated bottles). In the prior art, much has been done in attempts to control the force of air, such as modulation of the blower speed, which requires motor speed controls. However, reaction time in depleting the air stored in the plenum as well as in replenishing air blown within the plenum is rather slow compared to the more immediate response required in high speed production lines. In other prior art conveyors, louvers have been installed in the walls of the plenum in an effort to control the speed of single (random) bottles while applying greater force against the slugs. However, since accumulated slugs can and do occur randomly at any place along a given conveyor span, the complexity of such applications becomes neither economical nor practical.

OBJECTIVE OF THE INVENTION

An objective of this invention is to provide an air conveyor that, in a practical and economical manner, moves the bottles along the path between work stations at a generally constant speed and maintains a small generally constant space between adjacent bottles.

SUMMARY OF THE INVENTION

The air conveyor of the present invention can move plastic bottles at a substantially constant speed. The bottles generally are of the conventional type, each having an upper end, usually threaded, for receiving a cap. An outwardly tapered neck below the upper end leads to an annular shoulder defining the upper portion of the main receptacle or body of the bottle. An outwardly projecting annular rim or ring is at the top of the tapered neck.

The air conveyor includes a housing defining an air plenum. The bottom wall of the housing has a pair of spaced flanges. The flanges provide opposed inner edges which define a central longitudinal slot.

The housing supports two rows of nozzles on opposite sides of the slot and having their inlets in communication with the plenum. A blower delivers pressurized air to the plenum and the plenum transfers the air to the nozzles. The nozzles are oriented such that the nozzle outlets direct air in streams that are downward, inward, and forward against the shoulder portions and progressively against portions of the body below the shoulder as the bottles are slidably supported between the flanges.

The air streams create a low pressure region above the flanges and within the interior of the central channel area. The low pressure region contributes to a lifting effect on the bottles, consequently reducing the sliding drag between the neck rims and flanges. The locations of the nozzle outlets relative to the bottles and the angles of the air streams cause the bottles to be conveyed at substantially constant speeds with small substantially constant spacing maintained between adjacent bottles. Bunching and bumping of bottles are significantly reduced.

The nozzles are removable inserts. Accordingly, the flanges are provided with a series of bores. Each nozzle includes a head portion, and a pair of resilient prongs extend up from the head portion. The prongs are to be inserted into the flange bores for latching onto the upper surface of the flange. An interior passage extends through each nozzle between an inlet through the head portion and an outlet through the side of the nozzle. The outlet generally directs air in a downward, inward, and forward stream.

In a second embodiment of the invention, the inner edges of the flanges that define the slot are specially chamfered to prevent wedging and jamming of bottles that have prominently outwardly tapered neck portions.

BRIEF DESCRIPTION OF THE DRAWINGS

Further objects and features of the present invention are revealed in the following detailed description of the preferred embodiment of the invention and in the drawing figures wherein:

FIG. 1 is a side elevation view, partly in section and partly broken away, of the air conveyor apparatus of the present invention, with a plurality of plastic bottles shown to illustrate the function of the apparatus;

FIG. 2 is a partial section view, partly broken away, taken along the line 2—2 of FIG. 1, with a representation of an air blower shown on a reduced scale for illustrative purposes only;

FIG. 3 is an enlarged partial section view, with portions broken away, taken along the line 3—3 of FIG. 2;

FIG. 4 is a partial section view taken along the line 4—4 of FIG. 3;

FIG. 5 is a section view taken along the line 5—5 of FIG. 3;

FIG. 6 is a partial section view taken along the offset line 6—6 of FIG. 4; and

FIG. 7 is an enlarged partial section view of another embodiment of the flange margin of each support plate.

DESCRIPTION OF THE PREFERRED EMBODIMENTS

The air conveyor 10 of this invention can be as long as desired, and the drawings illustrate a representative span. In FIG. 1, the air conveyor is shown conveying a succession of closely-spaced plastic bottles A from an upstream location (left in FIG. 1) toward a downstream or forward direction (right in FIG. 1).

FIG. 2 shows that the basic air conducting components of this air conveyor apparatus 10 consist of an air supply, such as an air blower 12, an elongated plenum chamber 14, and lateral left and right rows of air nozzles 16 and 18.

The plenum chamber 14 has a box-like construction of top, side, and bottom walls. Together these walls define a cross-section shape (as viewed in FIG. 2) somewhat like an inverted block U. More particularly, an elongate cover sheet 22 extends laterally between outer apertured margins 24. An opposite pair of elongate side walls 26 and 28 extend vertically between upper and lower apertured flanges 30 and 32. A first series of fasteners 34 interconnect the outer apertured margins 24 with the upper apertured flanges 30. A laterally spaced pair of elongated plates 36 and 38 extend laterally between outer margins 40 and inner flange margins 42. A second series of fasteners 44 interconnect the outer apertured margins 40 of the plates with the respective lower apertured flanges 32. An elongated inverted channel 46 has flanges 48 connected by fasteners 50 to the plates 36 and 38 respectively, with the inner flange margins 42 within the channel 46.

The inverted channel 46 has a central top wall 58 that underlies a plurality of longitudinally-spaced crossbeams 60. Each crossbeam 60 extends laterally between the opposite side walls 26 and 28 and has opposite ends provided with threaded apertures for receiving bolts 62 that fasten the crossbeam 60 to the adjacent side walls 26 and 28. Each crossbeam 60 has a vertical threaded aperture at its center for receiving a bolt 64 that extends through and connects the adjacent top wall 58 of the inverted-channel 46 to the crossbeams 60.

The blower 12 can be of any standard type that is well known in the art. Its output is conducted to the plenum. 14 through a tubular conduit 68. The conduit 68 has an end formed with an annular apertured flange 70, for mounting to the right side wall 28 as shown in FIG. 2. Four crossbars 72 are mounted between the side walls 26 and 28 by bolts 74 for bracing the side wall 28 where it is connected to the annular flange 70. As illustrated in FIG. 1, the right side wall 28 has a large circular opening 76 in the region of the flanged end of the conduit 68 to allow air to flow from the conduit 68 to the plenum 14.

FIGS. 3 and 4 more fully show how successive bottles A are supported for being conveyed. The plastic bottles A are of a common type that are characterized as having an annular ring B about the upper area of the neck portion C and below the throat portion T. The flange margins 42 of the plates 36 and 38 are inward of the plenum 14 and are within the inverted channel 46. The flange margins 42 have inner edges 78 and 80 of about 0.075–0.090 inch thickness that define a longitudinally extending slot 82 between them. Below the inner edges 78 and 80 there are 45° chamfers 83 and 84 to accommodate the outwardly flaring neck portion C. The neck portion C immediately below the rim B of each bottle A fits through the slot 82 in close proximity to the edges 78 and 80 of the flange margins 42. The ring portion B of each bottle A, however, is larger in diameter than the lateral width of the slot 82 so the flange margins 42 will support the bottles A by their rings B. To reduce drag, the plates 36 and 38 preferably are made of a smooth plastic.

FIG. 7 illustrates an alternative embodiment of a flange margin 42' of the plate 36. (An opposite flange margin 42' would be on the plate 38.) This embodiment is to prevent wedging of bottles in the slot 82. In this connection it is noted that the neck portion C' of a bottle A' may begin to taper outwardly immediately below the ring B'. The outward taper may be relatively abrupt as illustrated in FIG. 7 and could cause wedging with even thin inner edges 78 and 80 (of FIG. 4) that are vertical. Such wedging or Jamming is even more likely if the bottles wobble in a longitudinal direction. On the flange margins 42' of the plates 36 and 38 of FIG. 7, the inner edges 78' and 80' taper outwardly in a downward direction by about $4\frac{1}{2}°$ to 5° from vertical. Between the inner edges 78' and 80' and lower 45° chamfers 83' and 84' there are chamfers 85' and 86' at angles to vertical of about $22\frac{1}{2}°$. These chamfers generally follow and maintain spacing from the outwardly flared neck portion C' of the bottle A' illustrated in FIG. 7, and wedging and jamming of the bottles A' are prevented. These chamfers could be replaced by rounded inner edges.

The motive force that conveys the bottles A is a plurality of air streams discharged from the nozzles 16 and 18. Each nozzle 16 and 18 is molded as a unitary piece of plastic or other suitable material or is cut from solid cylindrical stock. All of the nozzles 16 and 18 are fixed in place, each with its central axis 87 oriented vertically. Each nozzle 16 and 18 generally has a side wall 88 extending vertically between an upper end 90 and a lower end 92. For ease of manufacture, the wall 88 is cylindrical, but it can be any desired shape. Each nozzle has an air inlet 94 bored partly through from the upper end 90 along the vertical centerline 87. The air inlet 94 extends down to the region of an intersection 96 between the central axis 87 and another reference centerline 98. An air outlet 100 is in the form of a vertical slot in the shape of a V having a lower concave wall 102 the axis of which is the reference centerline 98 and an upper concave wall 104 that diverges from a vertex 106 generally located at the intersection 96. The lower wall 102 is at about 47° below horizontal and the upper wall 104 is at about 48° above horizontal, to open through the side wall 88 in a vertically elongated opening 107. A lower corner of each nozzle 16 and 18 is removed by a chamfer 108 of about 45°. The diameter of the bore 94 is about $\frac{1}{4}$ inch and the width of the slot 100 is about $\frac{1}{8}$ inch. These dimensions can be varied to change the air flow characteristics. Increasing the diameter of the bore 94 and width of the slot 100 increases the volume of air flow against the bottles, but also increases the minimum blower horsepower required. Decreasing the diameter of the bore and width of the slot increases the force of the air while requiring less air but also reduces the total volume of air against the bottles.

The left and right rows of nozzles 16 and 18 depend from the left and right plates 36 and 38, as shown by FIGS. 3, 4, 5, and 6. For this purpose, the plates 36 and 38 have single rows of longitudinally spaced holes 110 and 112 respectively through them. Each nozzle 16 and 18 has a shoulder 114 and a reduced shaft portion 116 that extends vertically up from the shoulder 114 to an overhanging annular lip 118. A flared-out ring portion 120 extends up from the lip 118, vertically for part of the distance and then tapering inward to intersect the upper end 90. Notches 122 and 124 are laterally recessed into the flared ring portion 120 as well as in parts of the ring portion 116. The resulting arrangement provides each nozzle 16 and 18 with forward and rearward prongs 126 and 128.

These prongs 126 and 128 enable a press-fit engagement between the plates 36 and 38 and the nozzles 16 and 18 respectively. Preferably, the plastic (or other suitable material) of the nozzles 16 and 18 is inherently resilient. The procedure for press-fitting a nozzle 16 or 18 into a bore 110 or 112 begins with inserting the prong structures 126 and 128 into the bore from below. During insertion, the taper of the flared-out ring portion 120 guides the prongs 126 and 128 through the bore 110, 112 as the prongs 126 and 128 resiliently deflect toward each other. The nozzle 16, 18 is preferably driven upwardly until the shoulder 114 abuts the lower surface of the plate 36 or 38. At that point, the overhanging lip 118 will have extended free of the bore 110 or 112 above the upper surface of the plate 36 or 38. The inherent resiliency of the prongs 126 and 128 then moves the lip 118 laterally over portions of the upper surface of the flange 36 or 38, thereby retaining the nozzle 16 or 18 in place. As best shown in FIGS. 3 and 4, the side surface of the notch 122 abuts the inner surface of the adjacent side wall 26 or 28, thereby selectively orienting the nozzle 16 or 18. In a preferred embodiment of the invention, this selected orientation positions the axes 98 of the outlets at an angle E of about 30° inward of a longitudinal plane (see FIG. 3). Each nozzle 16 and 18 can be forcibly removed for replacement.

OPERATION AND USE

The air conveyor 10 moves the plastic bottles A by virtue of air streams directed at the shoulder regions D (and progressively at the body) (see FIG. 4) of the bottles A. Pressurized air is supplied by the blower 12 to the plenum 14 for manifold distribution to the nozzles 16 and 18. The nozzles 16 are in a row on one side of the bottles and the nozzles 18 are in a row on the other side of the bottles. The majority or primary flow of the air stream discharged through each nozzle outlet 100 is in the direction of the reference centerline 98 (and 98'). However some air is discharged further upwardly from the outlet. Each centerline 98 and 98' of the nozzles 16 and 18 lies in the vertical cutting plane of line 5—5. The vertical cutting plane of line 5—5 extends inwardly from the downstream or longitudinal direction at an angle E that is between about 20° and about 55°. An angle E of about 28° to 30° has been effective. FIG. 5 shows that centerline 98 (or 98') of each nozzle 16 and 18 extends down relative to the horizontal at a preferred angle F of about 47°. The angle F preferably should be within the range between about 20° and about 55°.

Preferably, the longitudinal spacing between the nozzles 16 and 18 is selected so that the longitudinal span between the vertical centerlines 87 of every fourth nozzle 16 and of every fourth nozzle 18 is about equal to the large diameter G (see FIG. 4) of the bottles A. In these variations, a given air conveyor will function successfully to convey smaller bottles in which case only two adjacent nozzles blow, or perhaps only one nozzle blows, against opposite sides of a moving bottle. This preferable spacing between adjacent nozzle centers 87 would be such that three adjacent nozzles 16 and 18 will blow against opposite sides of a moving bottle A as the bottle is blown downstream into the paths of air streams from groups of three nozzles 16 and 18 progressively farther downstream. However variations are possible and a given installation will work for bottles of various sizes and configurations.

As previously indicated, the nozzles 16 and 18 discharge air in streams that are inward, forward, and primarily downward. There are also weaker secondary components of the streams that are inward, forward and progressively reduced downward directions. The sum effect of these primary and secondary air stream components upon the shoulder regions D (and body) of the bottles A is to convey the bottles A forwardly through the slot 82. This orientation and location of nozzles 16 and 18 conveys the bottles A at nearly constant speed with minimum acceleration as the bottles progress forwardly or downstream. Also, this arrangement of nozzles 16 and 18 moves the bottles A downstream while substantially maintaining a slight spacing between most adjacent bottles A.

It should be recognized that seams are formed on a bottle during molding. Occasionally these seams will engaging the edges 78 and 80 and temporarily create drag until aided in moving forward by a trailing bottle. Such an event creates an exception to the maintenance of constant speed and spacing of the bottles. Nevertheless, such "stubborn" bottles are more readily kept moving by the superior conveying effect of the present invention.

Because of the rushing air emerging in the primary air streams along each axis 98, a venturi effect is created tending to suck air into the upper portion of the outlet slot 100 from beneath the plates 36 and 38. Air is also drawn through the slot 82 and as a result a low pressure region is established above the inner flange margins 42 and within the interior of the inverted channel member 46. This low pressure region contributes to a lifting force on the moving bottles A, reducing sliding drag between the rims B of the bottles and the flange margins 42.

The low pressure condition caused by the suction effect on air within the interior of the inverted channel member 46 also counteracts the possible flow of dust into the bottles. Such dust flow is also minimized by the fact that, on the air conveyor of this invention, air (that might contain or draw dust particles with it) is not blown against or toward the throat portions T of the bottles.

In FIGS. 3 and 5, the configuration and orientation of the nozzles causes the discharging air streams to be at an inward angle E equaling about 30° and downward angle F equaling about 47°. Variations of these angles within broad ranges are possible. For example, actual trials have been performed with nozzles in which both the angle E and the angle F were about 45°. Generally, the same positive gains were obtained, namely, the maintenance of substantially constant bottle speed with minimum acceleration, the maintenance of substantially uniform spacing between adjacent bottles, and the creation of low pressure area resulting in the reduction of drag.

While the present invention has been described by reference to a specific embodiment, it should be understood that modifications and variations of the invention may be constructed without departing from the scope of the invention defined in the following claims.

What is claimed is:

1. A conveying apparatus for conveying articles forward in a longitudinal direction of the apparatus wherein each article has an intermediate enlargement and an upper portion thereabove and a lower portion therebelow, the conveying apparatus comprising:
   a pair of elongated members providing opposed inner edges and upper surface margins adjacent the inner edges, the inner edges defining a central slot that extends in the longitudinal direction, the upper surface margins providing slidable support for the intermediate enlargements;
   the elongated members having portions on opposite sides of the slot for supporting a plurality of nozzle ends below the upper surface margins;
   each nozzle end having an outlet recessed therein and each nozzle end being a part of an individual nozzle removably engaged with one of the elongated members;
   air blower means for supplying the outlets with pressurized air; and
   means associated with each outlet for directing the air discharged from each outlet in a stream that is forward, inward, and downward relative to said longitudinal direction; wherein
   the articles are moved forwardly through the slot by the force of the air streams thereagainst.

2. The conveying apparatus of claim 1 wherein:
   the air streams approach the articles from such locations and directions that the articles are blown at a generally constant speed.

3. The conveying apparatus of claim 1 wherein:
   the air streams approach the articles from such locations and directions that the articles while conveyed are substantially maintained closely spaced but separated from one another while moving forwardly through the slot.

4. The conveying apparatus of claim 1 wherein: the directing means direct the air in streams that are between about 20° and about 55° inward of said longitudinal direction.

5. The conveying apparatus of claim 1 wherein:
   the directing means direct the air in streams that are at angles of between about 20° and 50° below horizontal.

6. The conveying apparatus of claim 5 wherein:
   the directing means direct air streams that are at an angle of between 42° and about 47° below horizontal.

7. The conveying apparatus of claim 1 wherein:
   adjacent nozzle ends are spaced in the longitudinal direction so that each article, while moving successively past the nozzle ends, is generally always in the path of at least two air streams on each side of such article.

8. The conveying apparatus of claim 1 wherein:
   the outlets are arranged in two longitudinal rows, one row being on each side of the slot.

9. The conveying apparatus of claim 1 wherein the opposed inner edges are tapered outwardly in a downward direction.

10. The conveying apparatus of claim 1 wherein the opposed inner edges include upper portions that are slightly outwardly tapered in a downward direction, intermediate portions that are moderately outwardly tapered in a downward direction, and lower portions that are significantly outwardly tapered in a downward direction.

11. A conveying apparatus for conveying containers wherein each container has an intermediate enlargement, an upper portion thereabove and a shoulder portion therebelow, the conveying apparatus comprising:
    a pair of laterally spaced flange members providing opposed inner edges that define an elongated slot that extends in the forward to rearward direction;
    an inverted channel extending in the forward to rearward direction along substantially the entire length of the slot and laterally spanning the slot between secure engagements with each flange member;
    each flange member having a plurality of openings through it at spaced intervals in the forward to rearward direction;
    a plurality of nozzles for each flange member;
    each nozzle including a head portion, a side portion, and means associated with the head portion for insertion into one of the plurality of angle openings for removably engaging the respective flange member;
    an inlet through the head portion for intaking air from above said flange member;
    an outlet through the side portion for discharging the air below said flange member;
    each outlet discharging the air in a stream that extends generally downward, forward and inward; and
    the flange members providing the intermediate enlargements with slidable support and the inverted channel having an interior cross section sufficient for the unobstructed passage of the upper portions of the containers as the containers are moved forwardly by the force of the air streams against the shoulder portions of the containers.

12. The conveying apparatus of claim 11 wherein:
    the air streams are downward at angles of between about 20° and about 50° to horizontal.

13. The conveying apparatus of claim 12 wherein:
    the air streams are downward at an angle to horizontal of between about 42° and about 47°.

14. The conveying apparatus of claim 13 wherein:
    each nozzle outlet is a recess that has generally parallel vertical side walls laterally spaced by inclined upper and lower walls that diverge from the interior of the nozzle to the exterior thereof;
    said upper wall being at between about 45° and about 50° above horizontal and said lower wall being at between about 20° and about 45° below horizontal.

15. The conveying apparatus of claim 11 wherein:
    the nozzles discharge the air in streams that are inward from the forward direction by between about 20° and about 55°.

16. The conveying apparatus of claim 11 wherein:
    adjacent nozzles are spaced in the forward to rearward direction so that each container, while moving successively past the nozzles, is generally the target of at least two air streams from each side.

17. The conveying apparatus of claim 11 wherein:
the air streams create a low pressure region above the flange members and within the interior of the inverted channel portion, thereby supplying lift to the containers and reducing in the sliding drag between the intermediate enlargements and flange members.

18. The conveying apparatus of claim 11 wherein:
the nozzles on each side of the slot are spaced at substantially equal intervals in a single row in the forward to rearward direction; and
the nozzles on one side of the slot generally discharge the air in directions that are uniform while the nozzles of the other side of the slot generally discharge the air in directions that are mirror opposites of the directions of the air streams of said one side.

19. The conveying apparatus of claim 11 wherein:
each flange engaging means of each nozzle comprises a pair of resilient prongs extending upward from the head portion for latching onto the upper surface of the respective flange member.

20. The conveying apparatus of claim 19 wherein:
the prongs further have a recessed side providing a vertical face; and
each flange member is associated with an abutment for abutting the vertical face so that the removably engaged nozzle is placed in a selected orientation.

21. The conveying apparatus of claim 11 including:
an air plenum communicating pressurized air simultaneously to all the nozzles.

22. The conveying apparatus of claim 21 wherein:
the inverted channel constitutes a lower central portion of the plenum, thereby acting as a baffle for distributing pressurized air at generally uniform pressure simultaneously to all the nozzle inlets on both 23. A conveyor for conveying containers, each container having a neck ring and a shoulder below the neck ring, each neck ring having a maximum external dimension, the conveyor comprising:
a pair of laterally spaced flanges extending in a longitudinal direction, the pair of flanges having laterally opposed inner edges defining an elongated longitudinal slot therebetween, the slot having a length extending in the longitudinal direction and a substantially constant lateral width defined by the opposed inner edges of the flanges, the lateral width of the slot being less than the maximum external dimension of each container neck ring, the pair of flanges being configured to guide the containers along the slot between the inner edges of the pair of flanges with the neck ring positioned above the pair of flanges and the shoulder positioned below the pair of flanges;
a plurality of nozzles depending from each of the pair of flanges along substantially the entire length of the slot, each of the nozzles having an exterior side wall and each nozzle having an air inlet bored partly through an interior of the nozzle and an air outlet that extends through the nozzle interior from the air inlet and emerges from the nozzle interior through the nozzle side wall, the air outlet having a configuration of a diverging orifice configured for discharging an air stream from the air outlet and toward the container shoulders suspended in the slot to push the containers along the slot, the air outlet having a cross-sectional area which increases as the air outlet extends from the nozzle air inlet to the nozzle exterior side wall; and
air blower means for supplying air to the air inlets of the plurality of nozzles.

24. The conveyor of claim 23 wherein the air streams from the air outlets of the nozzles are directed toward the container shoulders from locations sufficient to convey the containers along the slot at a substantially constant speed.

25. The conveyor of claim 23 wherein the air streams from the air outlets of the nozzles are directed toward the container shoulders from locations sufficient to maintain the containers in a substantially close but separated spacing in the slot.

26. The conveyor of claim 23 wherein:
the pair of flanges extend in a substantially horizontal plane; and
the air streams from the air outlets of the nozzles are directed between about 20° and about 50° relative to the horizontal plane.

27. The conveyor of claim 26 wherein the air streams from the air outlets of the nozzles are directed between about 42° and about 47° relative to the horizontal plane.

28. The conveyor of claim 23 wherein the plurality of nozzles are spaced at substantially equal intervals and are aligned in two longitudinal rows, one row depending from each flange of the pair of flanges.

29. The conveyor of claim 23 wherein:
the plurality of nozzles depending from one of the pair of flanges directs the air streams in a first substantially uniform direction; and
the plurality of nozzles depending from the other of the pair of flanges directs the air streams in a second substantially uniform direction, the first and second directions being substantially symmetrically opposite from one another on opposite lateral sides of the elongated slot.

30. The conveyor of claim 23 wherein the plurality of nozzles are longitudinally spaced at intervals sufficient to assure that each of the containers conveyed in the slot is always pushed by the air streams discharged from at least four nozzles, two nozzles of which depend from one of the pair of flanges and two nozzles of which depend from the other of the pair of flanges.

31. The conveyor of claim 23 wherein the air streams from the air outlets of the nozzles are directed between 25° and 50° relative to the longitudinal direction.

32. The conveyor of claim 23 wherein each flange of the pair of flanges includes an upper surface adjacent the inner edge, each upper surface being configured to guide the neck rings and to permit the neck rings to slide along the upper surfaces with minimal drag.

* * * * *